US012606425B2

(12) United States Patent
Ijadi-Maghsoodi et al.

(10) Patent No.: US 12,606,425 B2
(45) Date of Patent: Apr. 21, 2026

(54) RESCUE HOIST CABLE FOUL PROTECTION

(71) Applicant: Hornet AcquisitionCo, LLC, Vancouver, WA (US)

(72) Inventors: Bejan Ijadi-Maghsoodi, San Dimas, CA (US); John H. Hill, La Verne, CA (US)

(73) Assignee: HORNET ACQUISITIONCO, LLC, Vancouver, WA (US)

( * ) Notice: Subject to any disclaimer, the term of this patent is extended or adjusted under 35 U.S.C. 154(b) by 131 days.

(21) Appl. No.: 18/628,093

(22) Filed: Apr. 5, 2024

(65) Prior Publication Data

US 2025/0153982 A1 May 15, 2025

Related U.S. Application Data

(60) Provisional application No. 63/598,384, filed on Nov. 13, 2023.

(51) Int. Cl.
| | |
|---|---|
| *B66D 1/40* | (2006.01) |
| *B64D 1/22* | (2006.01) |
| *B66D 1/24* | (2006.01) |
| *B66D 1/48* | (2006.01) |
| *A62B 1/08* | (2006.01) |

(52) U.S. Cl.
CPC ............... *B66D 1/485* (2013.01); *B64D 1/22* (2013.01); *B66D 1/24* (2013.01); *A62B 1/08* (2013.01); *B66D 2700/025* (2013.01)

(58) Field of Classification Search
CPC . B66D 1/36; B66D 1/46; B66D 1/485; B66D 1/56
See application file for complete search history.

(56) References Cited

U.S. PATENT DOCUMENTS

| | | | |
|---|---|---|---|
| 7,309,059 B2 | 12/2007 | Marcil | |
| 7,348,507 B1 * | 3/2008 | Mahnken | B66D 1/36 200/61.18 |

(Continued)

FOREIGN PATENT DOCUMENTS

| | | |
|---|---|---|
| CN | 116513997 | 8/2023 |
| DE | 102017130364 | 6/2018 |

(Continued)

OTHER PUBLICATIONS

European Patent Office, European Search Report dated Mar. 19, 2025 in Application No. 24207632.1.

*Primary Examiner* — Emmanuel M Marcelo

(74) *Attorney, Agent, or Firm* — SNELL & WILMER L.L.P.

(57) ABSTRACT

A hoist system for cable-reeling operations is disclosed herein. The hoist system includes a housing, a drum disposed within the housing and configured to spin about an axis, a motor configured to spin the drum about the axis, a cable configured to be wound and unwound from the drum as the motor spins the drum about the axis, a cable sensor configured to detect misalignment of the cable during the cable-reeling operations, and a motor controller operatively coupled to the cable sensor and the motor, wherein the motor controller is configured to receive a cable misalignment signal from the cable sensor and adjust operation of the motor in response to the cable misalignment signal.

18 Claims, 5 Drawing Sheets

(56)            References Cited

U.S. PATENT DOCUMENTS

| 10,662,036 B2 * | 5/2020 | Fretz ...................... H02K 11/26 |
|---|---|---|
| 10,723,602 B2 | 7/2020 | Maghsoodi |
| 10,858,104 B2 | 12/2020 | Ijadi-Maghsoodi et al. |
| 11,753,280 B2 | 9/2023 | Sundar et al. |
| 12,297,086 B2 | 5/2025 | Ijadi-Maghsoodi |
| 2018/0339891 A1 * | 11/2018 | Ijadi-Maghsoodi .... B66F 17/00 |
| 2019/0308853 A1 * | 10/2019 | Bryson .................... B66D 1/54 |
| 2020/0017217 A1 | 1/2020 | Ijadi-Maghsoodi et al. |
| 2020/0115201 A1 * | 4/2020 | Maghsoodi .............. B66D 1/54 |
| 2020/0385249 A1 | 12/2020 | Maghsoodi et al. |
| 2022/0332553 A1 * | 10/2022 | Azeredo .................. B66D 5/30 |
| 2025/0153982 A1 | 5/2025 | Ijadi-Maghsoodi et al. |

FOREIGN PATENT DOCUMENTS

| JP | 20000114088 | 4/2000 | |
|---|---|---|---|
| WO | WO-9958439 A2 * | 11/1999 | ............... B66D 1/36 |

* cited by examiner

RESCUE HOIST CABLE FOUL PROTECTION

CROSS-REFERENCE TO RELATED APPLICATIONS

This application claims priority to, U.S. Provisional Application Ser. No. 63/598,384, filed Nov. 13, 2023, and entitled "RESCUE HOIST CABLE FOUL PROTECTION," which is incorporated by reference herein in its entirety for all purposes.

FIELD

This disclosure relates to cable windings, and, more particularly, to cable mis-wraps and/or other cable fouls, such as encountered where winding and/or unwinding a cable onto a drum of a cable hoist system. In various embodiments, it is suitable for use with a rescue hoist in an aircraft, a construction hoist, etc.

BACKGROUND

Cables, chains, cords, fiber, ropes, and/or other types of extendible, flexible, and/or retractable lines (collectively referred to herein generally as a cable or wire-rope) can be wound onto and/or off a cable drum (also referred to herein as a drum) by action of a motor and drive assembly that rotates the drum in connection with hoisting, winching, and/or other cable-reeling applications. Oftentimes, the cable comprises helically wound, intertwined strands, in which the strands physically contact other strands along the cable. Where the cable is made of metal, it is electrically conductive.

During winding and/or unwinding, the cable can become mis-wrapped on the drum and/or otherwise fouled/strained, thereby causing equipment damage, operational delays, etc. For example, a cable can come out of alignment and risk being mis-wrapped during a winding operation due to, for example, an excessive amount of slack in a standing portion of the cable (also referred to as a payout), the cable becoming loose on the drum, a failure of a level-winding mechanism on the hoist or load, etc. In addition, a cable can also become otherwise fouled and/or strained due to, for example, binding, damage, defects, fraying, kinking, over-extending, pinching, splaying, splintering, splitting, stretching, tampering, vibrating, etc., and/or including as a result of a broken strand of a wire of the cable that can cause successive layers of wound cable to become misaligned and/or unbundled.

Various cable guides can be used to guide the cable evenly onto, and/or off, the drum. Thus, in instances where there is fouling of the cable at or near the drum, linear motion of the cable through the guide can be impeded, causing the cable to, for example, bend, bind, flip, turn, twist, and/or wind-up on itself, etc., including building-up to a distance and/or height sufficient to trip a proximity sensor for generating an alert and/or the like.

SUMMARY

Disclosed herein is a hoist system for cable-reeling operations. The hoist system includes a housing, a drum disposed within the housing and configured to spin about an axis, a motor configured to spin the drum about the axis, a cable configured to be wound and unwound from the drum as the motor spins the drum about the axis, a cable sensor configured to detect misalignment of the cable during the cable-reeling operations, and a motor controller operatively coupled to the cable sensor and the motor, wherein the motor controller is configured to receive a cable misalignment signal from the cable sensor and adjust operation of the motor in response to the cable misalignment signal.

In various embodiments, the motor controller is further configured to lower a current limit of the motor. In various embodiments, the motor controller is further configured to reduce a speed of the motor. In various embodiments, the hoist system further includes a brake operatively coupled to the drum and the motor controller is further configured to send instructions to the brake to apply a pressure to the drum to slow the spinning of the drum.

In various embodiments, the motor controller is further configured to incrementally lower a current limit over a period of time. In various embodiments, the motor controller is further configured to receive a cable alignment signal from the cable sensor indicating that the cable is aligned and adjust operation of the motor in response to the cable alignment. In various embodiments, the hoist system is configured for use as a rescue hoist for an aircraft.

Also disclosed herein is a system including a hoist including a drum, a motor configured to spin the drum, and a cable configured to be wound and unwound from the drum as the motor spins the drum, a cable sensor configured to detect a misalignment of the cable during while the cable is wound and unwound from the drum, a processor operatively coupled to the motor and the cable sensor, and a memory operatively coupled to the processor. The memory includes instructions stored thereon that, when executed by the processor, cause the processor to receive a cable misalignment signal from the cable sensor and adjust operation of the motor in response to the cable misalignment.

In various embodiments, the instructions, when executed by the processor, further cause the processor to lower an operational current limit of the motor. In various embodiments, the instructions, when executed by the processor, further cause the processor to reduce a speed of the motor. In various embodiments, the system further includes a brake operatively coupled to the drum and the instructions, when executed by the processor, further cause the processor to send instructions to the brake to apply a pressure to the drum to slow the spinning of the drum.

In various embodiments, the instructions, when executed by the processor, further cause the processor to incrementally lower a current limit over a period of time. In various embodiments, the instructions, when executed by the processor, further cause the processor to receive a cable alignment signal from the cable sensor indicating that the cable is aligned and adjust operation of the motor in response to the cable alignment signal. In various embodiments, the hoist is configured for use as a rescue hoist for an aircraft.

Also disclosed herein is method including commanding, by a processor, a motor to run, the motor configured to rotate a drum to wind and unwind a cable from the drum, receiving, by the processor, a cable misalignment signal indicating that the cable is misaligned, and sending, by the processor, an adjustment signal configured to adjust operation of the motor in response to the cable misalignment signal.

In various embodiments, sending the adjustment signal includes lowering, by the processor, a current limit of the motor. In various embodiments, sending the adjustment signal includes reducing, by the processor, a speed of the motor. In various embodiments, sending the adjustment signal includes sending, by the processor, instructions to a brake operatively coupled to the drum to apply a pressure to the drum to slow the rotation of the drum. In various embodiments, sending the adjustment signal includes lower, by the processor, a current limit of the motor incrementally over a period of time. In various embodiments, sending the adjustment signal includes reducing, by the processor, a speed of the motor incrementally over a period of time.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
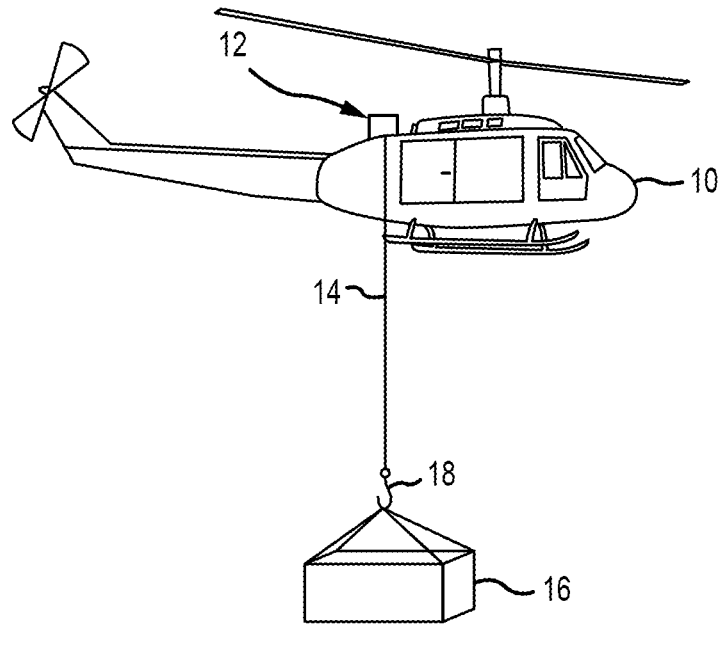
FIG. 1 illustrates an aircraft having a rescue hoist, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Referring generally, hoists are devices used to mechanically lift and/or lower loads-oftentimes by a motor-driven drum or lift-wheel around which a cable winds and/or unwinds, in various embodiments. In various embodiments, hoists are operated electrically, hydraulically, manually, and/or pneumatically. Still referring generally, hoists apply a pulling force to the load through the cable in order to control and/or move the load from one physical location to another physical location. In various embodiments, hoist assemblies have a lifting harness, hook, hoop, loop and/or other suitable attachment end (collectively referred to herein generally as a hook) at a distal end of the cable, which can be affixed and/or secured to the load. In various embodiments, the drum/lift-wheel at the cable end is the fixed end, and the hook end of the cable is the opposing free end. In various embodiments, the load is referred to as cargo, a payload, target, etc. In various embodiments, hoists couple the cable to the loads using the hook. In various embodiments, an effective radius of the drum or lift wheel increases as the cable is pulled in, and it decreases as the cable is let out, due to the physically changing, radially successive layers of cable laid thereon.

In various embodiments, hoists are used in many environments, such as air rescues, automobile/car/truck applications, anchor systems, cable cars, cranes, elevators, escalators, mine operations, moving sidewalks, rope tows, ski lifts, tethers, etc.

Referring generally, a rescue hoist can be used to pull a target towards and/or into a rescue aircraft, such as a rescue helicopter, including by initially lowering a basket, cage, or other device to the target, securing the target, and then pulling back and/or retrieving the target back to the rescue aircraft, in various embodiments. In various embodiments, the target is in peril and/or in need of hoisting assistance.

In various embodiments, rescue hoists deploy and retrieve cable through a cable guide that feeds the cable to and from a drum. In various embodiments, the cable is levelly wound through a level-winding mechanism across a length of the cable, including in order to prevent it from fouling and/or incurring other damage.

Referring generally, hoists and/or rescue hoists are mounted to an aircraft, such as a helicopter, and/or in various other applications, configurations, platforms, etc. as well.

For example, a category I hoist typically includes a translating drum, wherein the translating drum also functions as the level-winding mechanism. In various embodiments, category I hoists typically allow for the cable to be deployed through a single point in a hoist housing, thereby dispersing side loads from the cable to the structure of the hoist. In various embodiments, category I hoists use drivetrains that are separately mounted from their translating drums.

A category II hoist, on the other hand, typically includes a stationary drum, and the drivetrain is mounted within the stationary drum, providing for a generally compact footprint of the category II hoist. In various embodiments, category II hoists typically include a translating level-winding mechanism that shuttles in a reciprocating manner to level-wind the cable onto the stationary drum. In various embodiments, the translating level-wind mechanism can be susceptible to fouling due to side loads experienced by the cable, as the side loads are transferred through the level-winding mechanism and to the supporting structure, in various embodiments.

Referring now to FIG. 1, a helicopter 10 including a hoist system 12 is illustrated, in accordance with various embodiments. In various embodiments, helicopter 10 may be used for search and rescue missions. In various embodiments, an airplane, a drone, a truck, a ship, or other vehicle may be used instead of helicopter 10. Hoist system 12 is attached to a support of helicopter 10 and used to extend and/or retract (e.g., lower and/or raise, respectively) a cable 14 (aka a wire-rope) connected to a load 16 via a hook 18 and/or the like. In various embodiments, one or more crew members of helicopter 10 operate helicopter 10, while one or more crew members operate hoist system 12. In various embodiments, one or more crew members guide a distal, attachment end of cable 14 (i.e., towards hook 18) and/or hook 18 to load 16, including by directing the pilot(s) of helicopter 10 on how, when, where, etc. to maneuver helicopter 10. For example, to position hook 18 directly and/or nearly directly over load 16, crew members communicate position control information to the pilot(s), and the pilot(s) appropriately position(s) helicopter 10 and/or hook 18 relative to load 16 in response. In various embodiments, this may apply equally during payout and retraction of cable 14 from hoist system 12 of helicopter 10. In various embodiments, hoist system 12 is affixed in and/or to a boat, a building, a crane, a flying craft, a hangar, a land, a ship, a support, a train, and/or other suitable retaining platform.

Figure 2:
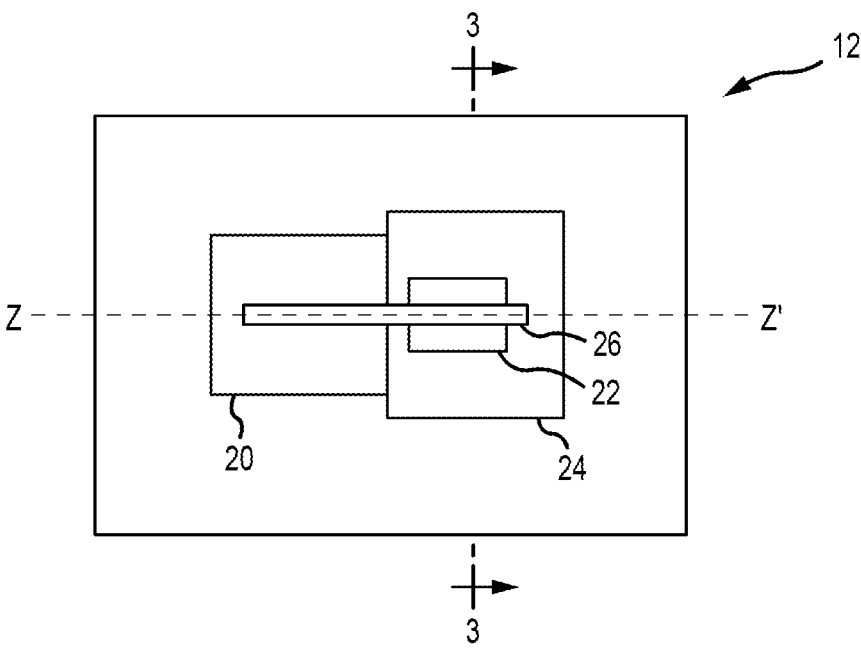
FIG. 2 illustrates a simplified block view of a part of a rescue hoist.

Referring now to FIG. 2, a simplified block view hoist system 12 described in FIG. 1 is illustrated, in accordance with various embodiments. Hoist system 12 includes a motor 20 in communication with a drum 22 (aka a cable drum) of a drum assembly 24 via a shaft 26 interconnected therebetween. As motor 20 spins shaft 26, drum 22 of drum assembly 24 winds and/or unwinds cable 14 illustrated FIG. 1 about drum 22. Shaft 26 is oriented about and/or defines an axis Z-Z' running through a part of hoist system 12 comprising motor 20 and drum assembly 24. In various embodiments, other pulleys and/or other rotatable components of hoist system 12 run on axes parallel to the axis Z-Z'.

Figure 3:
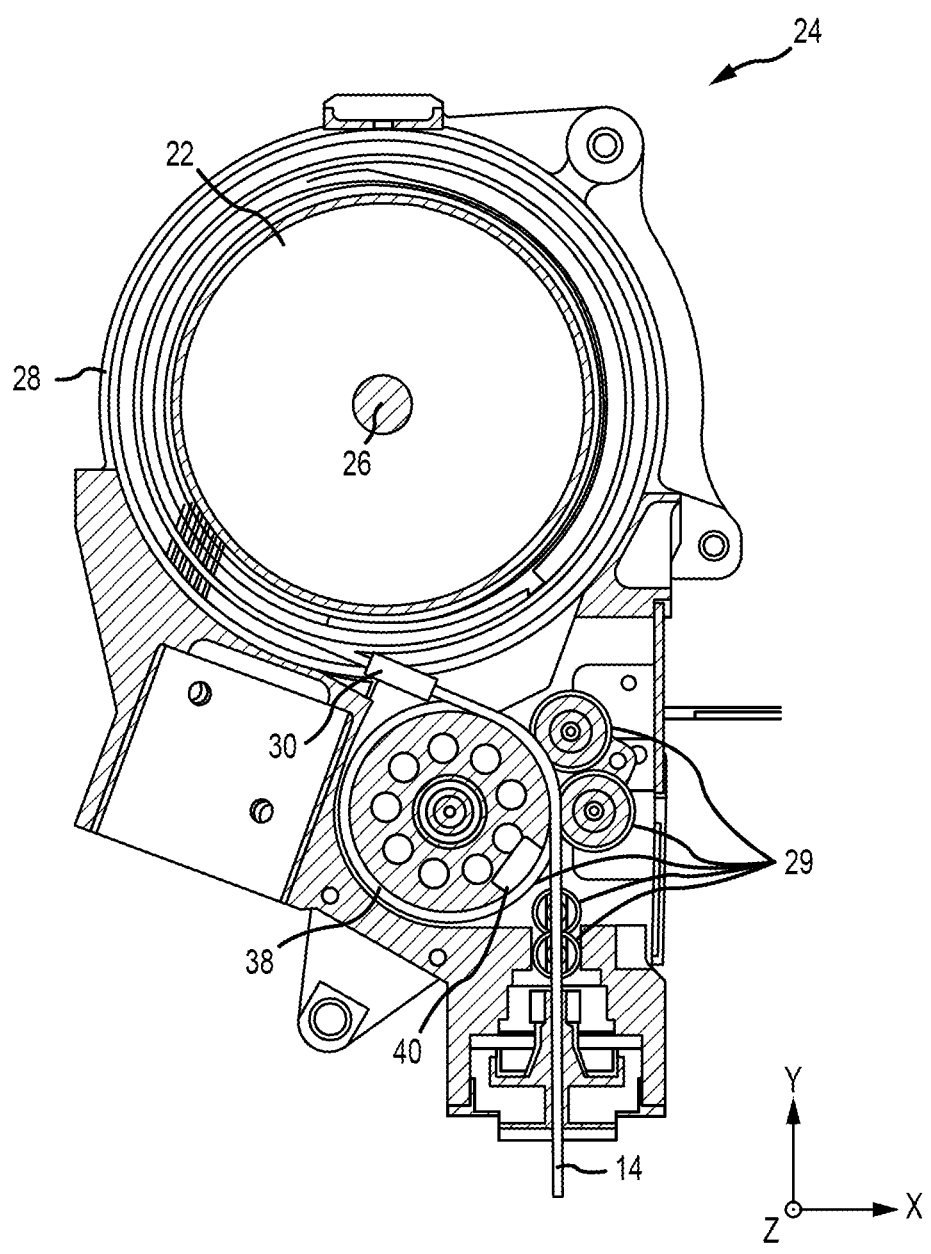
FIG. 3 illustrates a partial cross-sectional side view of a part of a rescue hoist, in accordance with various embodiments.

Referring now to FIG. 3, it is a partial cross-sectional side view of a part of drum assembly 24 is illustrated, in accordance with various embodiments. The partial cross-sectional side view is taken along line 3-3 in FIG. 2. As illustrated in FIG. 3, drum assembly 24 shows cable 14 partially wound around drum 22 within a housing 28 of drum assembly 24. In various embodiments, cable 14 is attached to hook 18 (see FIG. 1) at its free end and to drum 22 at its fixed end. In various embodiments, drum 22 is cylindrical and spins about the axis Z-Z' as it winds and/or unwinds cable 14 from drum 22. In various embodiments, drum 22 is supported by a suitable structure within housing 28 that allows it to spin about the axis Z-Z', such as through suitable supports and bearings. In various embodiments, drum 22 and shaft 26 are driven about the axis Z-Z' by motor 20. In various embodiments, drum 22 and shaft 26 are driven by motor 20, as opposed to otherwise, for example, being freely rotatable within drum assembly 24.

In various embodiments, hoist system 12 includes a cable spool for load-bearing cable 14, and for which continuous and/or periodic monitoring of cable 14 ensures proper winding and/or unwinding about drum 22. More specifically, a system of rollers and guides 29 is used to guide cable 14 into, and/or out of, hoist system 12 for deployment into, and/or out of, for example, housing 28. Drum 22 and/or the system of rollers and guides 29 define a cable passageway (or functionally similar channel) (also referred to as a load path) that receives and/or guides cable 14 through housing 28. In various embodiments, hoist system 12 detects whether cable 14 becomes misaligned within the cable passageway of housing 28.

In various embodiments, hoist system 12 comprises one or more (e.g., two) electrical contact sensors 30 disposed along the cable passageway. In various embodiments, sensors 30 are proximal drum 22 and/or within housing 28. In various embodiments, sensors 30 are distal from drum 22.

Cable 14 stays within the cable passageway in response to hoist system 12 operating properly and cable 14 does not contact sensors 30. That is, hoist system 12 is operating properly and/or properly taking up and/or letting out cable 14—as representatively shown in FIG. 4. However, cable 14 may contact sensors 30 in response to cable 14 deviating from the cable passageway to a sufficient degree. That is, hoist system 12 is not operating properly and/or not properly taking up and/or letting out cable 14—as representatively shown in FIG. 5. In various embodiments, the deviation to the sufficient degree may be an angle in taking up and/or letting out cable 14. In various embodiments, the angle may be based on a diameter of cable 14 and/or a length of sensors 30. In various embodiments, the angle may be about 5° to about 45°, and more specifically, about 10° to about 20°.

Figure 4:
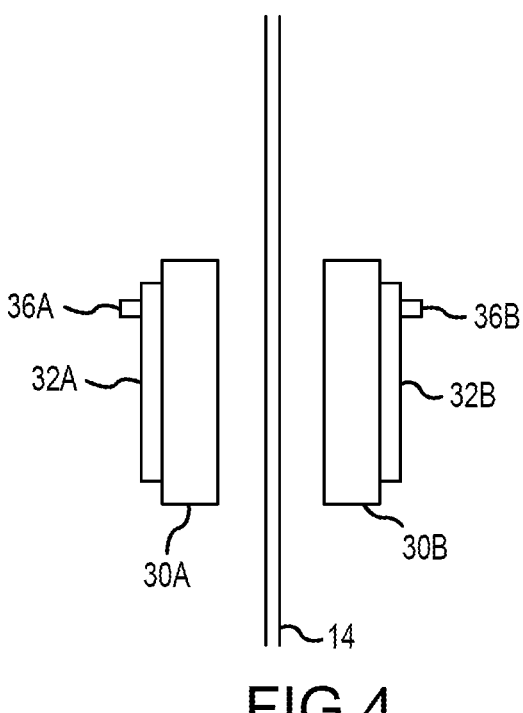
FIG. 4 illustrates a simplified block view of a cable aligned within at least a part of a cable passageway through a plurality of sensors, in accordance with various embodiments.
Figure 5:
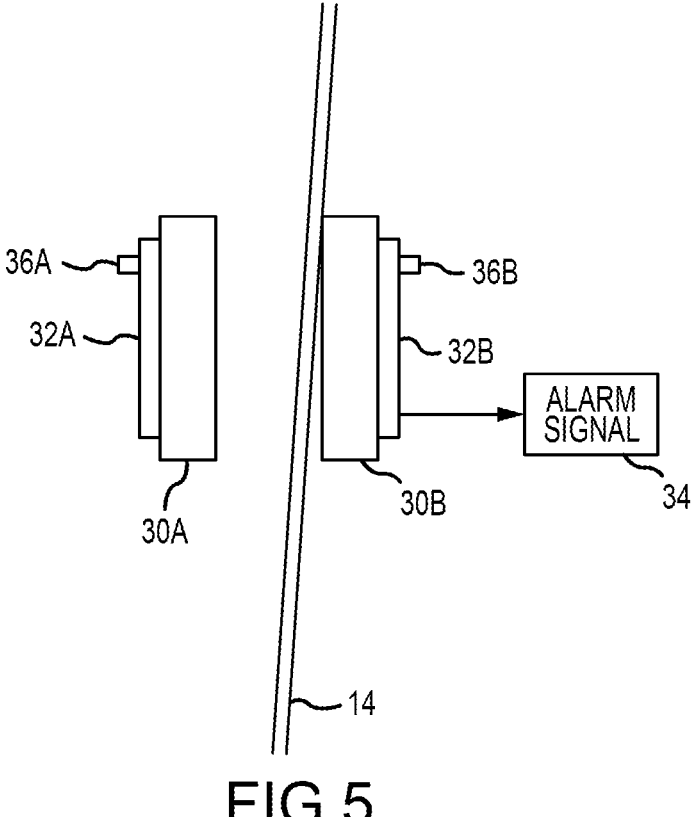
FIG. 5 illustrates a simplified block view of a cable misaligned within at least the part of the cable passageway through the plurality of sensors, in accordance with various embodiments.

Referring now to FIGS. 4 and 5, sensors 30 include a first sensor 30A and a second sensor 30B. In various embodiments, first sensor 30A is located on a first side of the cable passageway and second sensor 30B is located on an opposing second side of the cable passageway. In various embodiments, sensors 30 comprise one or more limit switches and/or micro-switches, collectively referred to herein generally as "switches" 32. For example, in various embodiments, first sensor 30A includes a first switch 32A, and second sensor 30B includes a second switch 32B.

In various embodiments, sensors 30 are triggered by physical contact with cable 14, particularly as cable 14 deviates from the cable passageway and/or starts to lag, lead, mis-wrap, and/or the like within hoist system 12. For example, one or more of sensors 30 is triggered in response to cable 14 contacting it, affecting the one or more switches 32, in various embodiments. In various embodiments, the one or more switches 32 may generate an alarm signal 34 in response to cable 14 contacting one or more of sensors 30.

During normal, non-fouled operation, contact sensors 30 do not affect and/or impede the functioning of hoist system 12. In various embodiments, hoist system 12 may disrupt (e.g., decreasing and/or halting) power to shaft 26 by motor 20 in response to cable 14 activating one or more of sensors 30. In various embodiments, power to shaft 26 is cut and/or otherwise interrupted and cable 14 is prevented from further winding and/or unwinding, including unless and/or until the error is corrected and/or cable 14 no longer contacts one or more of sensors 30—such as by realigning and/or re-positioning cable 14 within the cable passageway and/or along drum 22.

In various embodiments, power to and/or speed of shaft 26 is reduced and cable 14 may continue winding and/or unwinding at a slower speed and/or torque, including unless and/or until the error is corrected and/or cable 14 no longer contacts one or more of sensors 30—such as by realigning and/or re-positioning cable 14 within the cable passageway and/or along drum 22. In various embodiments, power is reduced by limiting the current supplied to motor 20.

In various embodiments, a cable guide includes a level-winding mechanism that controls alignment and/or positioning of the layers of cable 14 along drum 22 as cable 14 is wound onto drum 22, in the case of winding, and/or off drum 22, in the case of unwinding.

Figure 6:
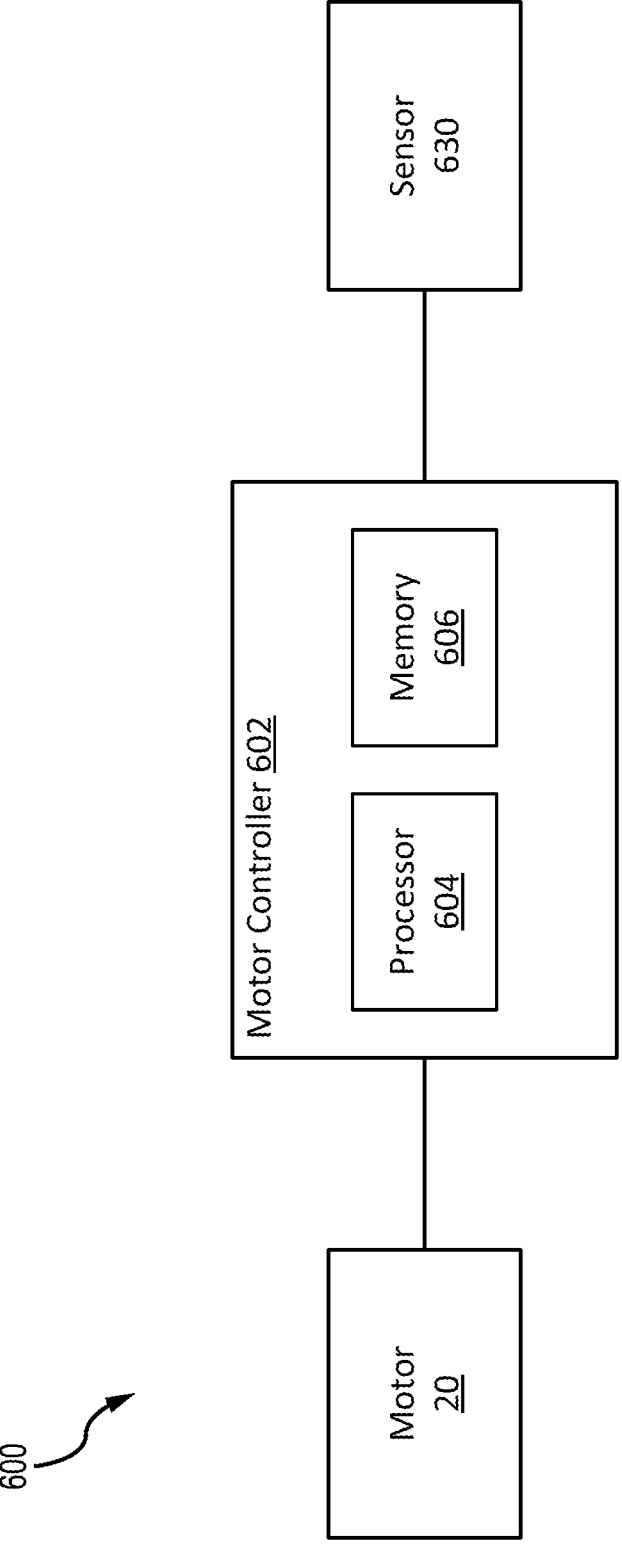
FIG. 6 illustrates a system diagram of a rescue hoist control system, in accordance with various embodiments.

Referring now to FIG. 6, a block diagram of a control system 600 for controlling hoist system 12, and more specifically, for controlling motor 20 is illustrated, in accordance with various embodiments. Control system 600 includes a motor controller 602 that is operatively coupled to a cable sensor 630 and to motor 20. As discussed above, motor 20 is operatively coupled to shaft 26. In various embodiments, cable sensor 630 may be an example of sensors 30 described above in FIGS. 3-5. In various embodiments, cable sensor 630 may be an example of different cable foul sensor.

Cable sensor 630 is configured to detect a misalignment of cable 14 within the cable passageway and transmit a signal to motor controller 602 indicating the existence of the misalignment. In various embodiments, a misalignment of cable 14 may indicate that the miswrapped and/or fouled. A cable miswrap occurs when a misalignment of cable 14 on drum 22 such as, for example, an overlapping of cable 14 on itself. A cable fouling occurs when cable 14 contacts an outer surface of drum 22. A misalignment of cable 14 on drum 22 may, in various embodiments, result in a break or other degradation in cable 14.

Motor controller 602 includes a processor 604 and a memory 606. Motor controller 602, and more specifically, processor 604, is configured to receive the indication of the misalignment from cable sensor 630 and adjust operation of motor 20 in response to the indication of the misalignment. Motor controller 602 may limit the torque, or force, on cable 14 by drum 22 in response to the indication of the misalignment. In various embodiments, motor controller 602 may limit a current to motor 20. In various embodiments, motor controller 602 may reduce a speed of motor 20, thereby reducing the speed of drum 22. In various embodiments, motor controller 602 may limit the current to motor 20 and reduce the speed of motor 20. In various embodiments, motor controller 602 may limit the current to motor 22.

In various embodiments, motor controller 602 may reduce the current limit of motor 20 by about 20% to about 70%, and more specifically, about 30% to about 50% of the maximum current limit. In various embodiments, motor controller 602 may reduce the speed of motor 20 by about 20% to about 70%, and more specifically, about 30% to about 50%. In various embodiments, motor controller 602 may reduce the speed of drum 22 by sending a signal to a brake to apply a braking force to slow a rotation of drum 22.

Limiting the force on cable 14 in this manner allows the operator of hoist system 12 to clear the misalignment and/or continue operation of hoist system 12 in a limited manner. For example, the operator may wind a length of cable 14 (e.g., about 5 feet to about 10 feet) off of drum 22 and then wind the length of cable 14 back onto drum 22 to clear the misalignment. As another example, the operator may continue winding cable 14 onto drum 22 at a slower speed and/or torque until cable 14 is completed retracted and wound onto drum 22. As another example, the operator may continue winding cable 14 off drum 22 at a slower speed and/or torque.

In various embodiments, cable sensor 630 may transmit a signal to motor controller 602 indicating that there is no misalignment. Motor controller 602 may increase the current limit and/or increase the speed of motor 20 in response to the indication that there is no misalignment.

Processor 604 may include one or more processors configured to implement various logical operations in response to execution of instructions, for example, instructions stored on a non-transitory, tangible, computer-readable medium. The one or more processors can be a processing chip, a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 606 may include memory to store data, executable instructions, system program instructions, and/or controller instructions to implement the control logic of processor 604.

Figure 7:
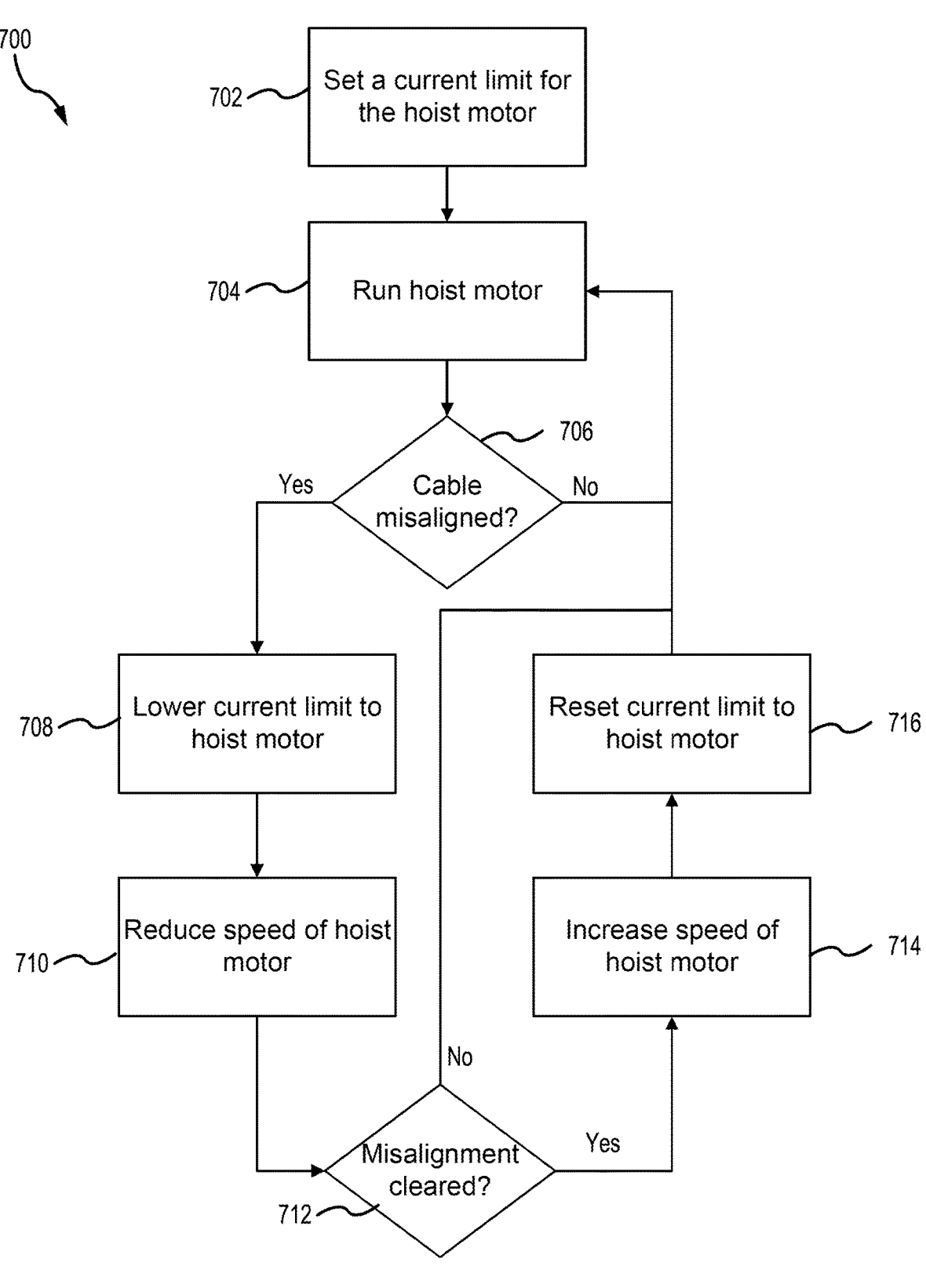
FIG. 7 illustrates a flow diagram of a method for controlling the current and speed of a rescue hoist motor, in accordance with various embodiments.

Referring now to FIG. 7, a flow diagram of a method 700 for controlling the speed and force of motor 20 is illustrated, in accordance with various embodiments. In various embodiments, the steps of method 700 may be performed by motor controller 602, and more specifically, by processor 604.

At block 702, processor 604 sets a current limit for a hoist motor (e.g., motor 20). The current limit is set to provide sufficient torque, or force, to cable 14 through drum 22 without damaging motor 20. At block 704, processor 604 runs motor 20 to rotate drum 22 to move cable 14. Processor 604 may run motor 20 based on input received from an operator.

At decision block 706. Processor 604 determines whether cable 14 is misaligned. In various embodiments, processor 604 receives a signal from a cable sensor (e.g., cable sensor 630) indicating whether or not cable 14 is misaligned, or miswrapped or fouled (i.e., a cable misalignment signal). If processor 604 determines that cable 14 is not misaligned, method 700 returns to block 704 to run motor 20. If, instead, processor 604 determines that cable 14 is misaligned, method 700 proceeds to block 708.

At block 708, processor 604 lowers the current limit for motor 20. In various embodiments, processor 604 lowers the current limit below a threshold. In various embodiments, processor 604 lowers the current limit to about 20% to about 70% of the original current limit, and more specifically, about 30% to about 50%. In various embodiments, processor 604 may incrementally decrease the current limit. That is, processor 604 may lower the current limit by a preset amount (e.g., about 5% to about 10% reduction) after a period of time has passed. In various embodiments, the period of time may be about 5 seconds to about 30 seconds, and more specifically, about 10 seconds to about 20 seconds.

At block 710, processor 604 reduces the speed of motor 20. In various embodiments, processor 604 may reduce a voltage applied to motor 20 to reduce the speed of motor 20. In various embodiments, processor 604 may send a signal to a brake to apply a force to motor 20 and/or drum 22 to reduce the speed of motor 20.

At decision block 712, processor 604 determines whether the misalignment of cable 14 is cleared. In various embodiments, processor 604 receives a signal from cable sensor 630 indicating whether or not the misalignment of cable 14 is cleared. If processor 604 determines that the misalignment of cable 14 has not cleared and that cable 14 is still misaligned, method 700 returns to block 704 to run motor 20. If, instead, processor 604 determines that the misalignment of cable 14 has cleared and that cable 14 is not misaligned (and generate, e.g., a cable alignment signal to processor 604), method 700 proceeds to block 714.

At block 714, processor 604 sets the current limit for motor 20 to the original current limit. In various embodiments, processor 604 may incrementally increase the current limit to the original current limit. That is, processor 604 may increase the current limit by a preset amount (e.g., about 5% to about 10% reduction) after a period of time has passed. In various embodiments, the period of time may be about 5 seconds to about 30 seconds, and more specifically, about 10 seconds to about 20 seconds.

At block 716, processor 604 increases the speed of motor 20. In various embodiments, processor 604 may increase the voltage applied to motor 20 to increase the speed of motor 20. In various embodiments, processor 604 may send a signal to a brake to remove the applied force from motor 20 and/or drum 22 to increase the speed of motor 20.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

The steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Furthermore, any reference to singular includes plural embodiments, and any reference to more than one component may include a singular embodiment. Use of 'a' or 'an' before a noun naming an object shall indicate that the phrase be construed to mean 'one or more' unless the context sufficiently indicates otherwise, as set forth in Slip op. at 8-9 (Fed. Cir. Oct. 19, 2023) (citing *Baldwin Graphic Sys., Inc. v. Siebert, Inc.*, 512 F.3d 1338, 1342-43 (Fed. Cir. 2008)). For example, the description or claims may refer to a processor for convenience, but the invention and claim scope contemplates that the processor may be multiple processors. The multiple processors may handle separate tasks or combine to handle certain tasks. Although specific advantages have been enumerated herein, various embodiments may include some, none, or all of the enumerated advantages. A "processor" may include hardware that runs the computer program code. Specifically, the term 'processor' may be synonymous with terms like controller and computer and should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A hoist system for cable-reeling operations, comprising:
   a housing;
   a drum disposed within the housing and configured to spin about an axis;
   a motor configured to spin the drum about the axis;
   a cable configured to be wound and unwound from the drum as the motor spins the drum about the axis;
   a cable sensor configured to detect misalignment of the cable during the cable-reeling operations; and
   a motor controller operatively coupled to the cable sensor and the motor, wherein the motor controller is configured to receive a cable misalignment signal from the cable sensor and adjust operation of the motor in response to the cable misalignment signal, wherein the motor controller is further configured to receive a cable alignment signal from the cable sensor indicating that the cable is aligned and adjust operation of the motor in response to the cable alignment.

2. The hoist system for cable-reeling operations of claim 1, wherein the motor controller is further configured to lower a current limit of the motor.

3. The hoist system for cable-reeling operations of claim 1, wherein the motor controller is further configured to reduce a speed of the motor.

4. The hoist system for cable-reeling operations of claim 1, further comprising:
   a brake operatively coupled to the drum,
   wherein the motor controller is further configured to send instructions to the brake to apply a pressure to the drum to slow the spinning of the drum.

5. The hoist system for cable-reeling operations of claim 1, wherein the motor controller is further configured to incrementally lower a current limit over a period of time.

6. The hoist system for cable-reeling operations of claim 1, wherein the hoist system is configured for use as a rescue hoist for an aircraft.

7. A system, comprising:
   a hoist including a drum, a motor configured to spin the drum, and a cable configured to be wound and unwound from the drum as the motor spins the drum;

a cable sensor configured to detect a misalignment of the cable during while the cable is wound and unwound from the drum;
   a processor operatively coupled to the motor and the cable sensor; and
   a memory operatively coupled to the processor, the memory comprising instructions stored thereon that, when executed by the processor, cause the processor to:
      receive a cable misalignment signal from the cable sensor;
      adjust operation of the motor in response to the cable misalignment;
      receive a cable alignment signal from the cable sensor indicating that the cable is aligned; and
      adjust operation of the motor in response to the cable alignment signal.

8. The system of claim 7, wherein the instructions, when executed by the processor, further cause the processor to lower an operational current limit of the motor.

9. The system of claim 7, wherein the instructions, when executed by the processor, further cause the processor to reduce a speed of the motor.

10. The system of claim 7, further comprising:
   a brake operatively coupled to the drum,
   wherein the instructions, when executed by the processor, further cause the processor to send instructions to the brake to apply a pressure to the drum to slow the spinning of the drum.

11. The system of claim 7, wherein the instructions, when executed by the processor, further cause the processor to incrementally lower a current limit over a period of time.

12. The system of claim 7, wherein the hoist is configured for use as a rescue hoist for an aircraft.

13. A method, comprising:
   commanding, by a processor, a motor to run, the motor configured to rotate a drum to wind and unwind a cable from the drum;
   receiving, by the processor, a cable misalignment signal indicating that the cable is misaligned;
   sending, by the processor, an adjustment signal configured to adjust operation of the motor in response to the cable misalignment signal;
   receiving, by the processor, a cable alignment signal from the cable sensor indicating that the cable is aligned; and
   adjusting, by the processor, operation of the motor in response to the cable alignment signal.

14. The method of claim 13, wherein sending the adjustment signal includes lowering, by the processor, a current limit of the motor.

15. The method of claim 13, wherein sending the adjustment signal includes reducing, by the processor, a speed of the motor.

16. The method of claim 13, wherein sending the adjustment signal includes sending, by the processor, instructions to a brake operatively coupled to the drum to apply a pressure to the drum to slow the rotation of the drum.

17. The method of claim 13, wherein sending the adjustment signal includes lowering, by the processor, a current limit of the motor incrementally over a period of time.

18. The method of claim 13, wherein sending the adjustment signal includes reducing, by the processor, a speed of the motor incrementally over a period of time.

* * * * *